UNITED STATES PATENT OFFICE.

MARK TOMLINSON, OF BIRMINGHAM, CONNECTICUT.

IMPROVEMENT IN COMPOSITION FOR MINIATURE-CASES, &c.

Specification forming part of Letters Patent No. 21,285, dated August 24, 1858.

*To all whom it may concern:*

Be it known that I, MARK TOMLINSON, of Birmingham, in the county of New Haven and State of Connecticut, have invented a new and useful Composition, capable of being made into Miniature-Cases, Boxes, Buttons, and a variety of other useful and ornamental articles; and I do hereby declare that the following is a full, clear, and exact description of the component parts of and methods of manufacturing and using the same.

This composition consists of equal parts, by weight, of shellac, Breckenridge or cannel coal, and ivory-black. The shellac and cannel-coal are first finely pulverized separately, and the three ingredients are then well mixed together and fed between a pair of steam-heated rollers, one of which rotates at a higher velocity than the other, and are thereby ground into a pasty mass, which while still hot and plastic is cut or divided by a spatula or other instrument into cakes of sufficient size to form the articles or pieces to be made. These pieces are laid upon a metal plate or tray and placed in an oven heated by steam or other agency and allowed to remain therein for about ten or fifteen minutes, after which they are taken out and while still hot are placed in steam-heated dies of the requisite form to produce the articles or forms desired, and therein subjected to a heavy pressure. The pieces or articles are then allowed to cool in the dies to a degree sufficient to enable them to be taken out without any danger of bending or otherwise injuring their form.

I employ for heating the rollers, oven, and dies used in the above manufacture steam at a pressure of about eighty pounds to the square inch, or, if the said rollers, oven, and dies, or either of them, be heated by any other agency, they should be heated to about the same temperature as is due to that pressure of steam.

The dies should have finely-polished faces when smooth surfaces are required on the articles to be made, and then the said surfaces will have as high a degree of smoothness as could be produced by the finest polish.

Articles made of this composition will neither warp by changes in the condition of the atmosphere nor have their surfaces spotted or injured in appearance by water, like the composition of shellac and sawdust, which is used for similar articles, and this composition possesses a greater degree of tenacity or less degree of liability to fracture.

I do not claim, broadly, the employment of shellac in compositions; but

What I claim as my invention, and desire to secure by Letters Patent, is—

The composition for useful and ornamental articles made of shellac, Breckenridge or cannel coal, and ivory-black, in about the proportions and in the manner substantially as set forth.

MARK TOMLINSON.

Witnesses:
H. D. HAWLEY,
F. P. ABBOTT.